A. HELFENSTEIN.
PROCESS OF OBTAINING METALS SUCH AS LEAD OR ZINC IN AN ELECTRIC FURNACE.
APPLICATION FILED FEB. 2, 1914.
1,167,998.
Patented Jan. 11, 1916.
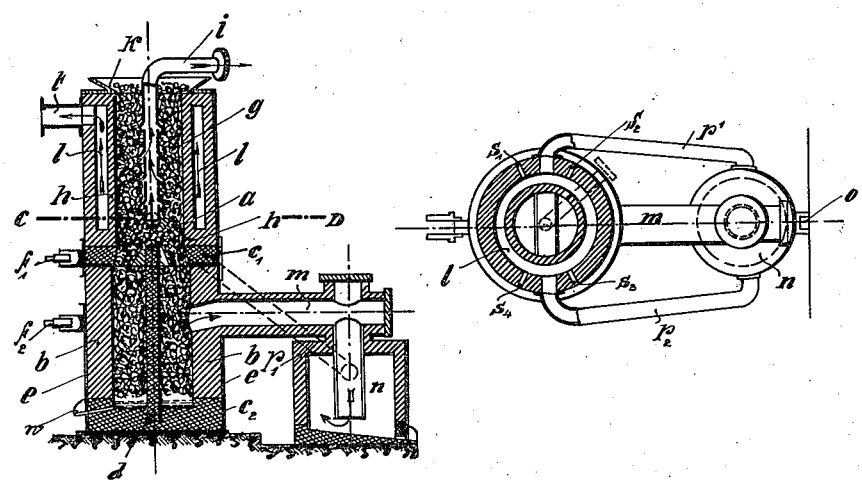
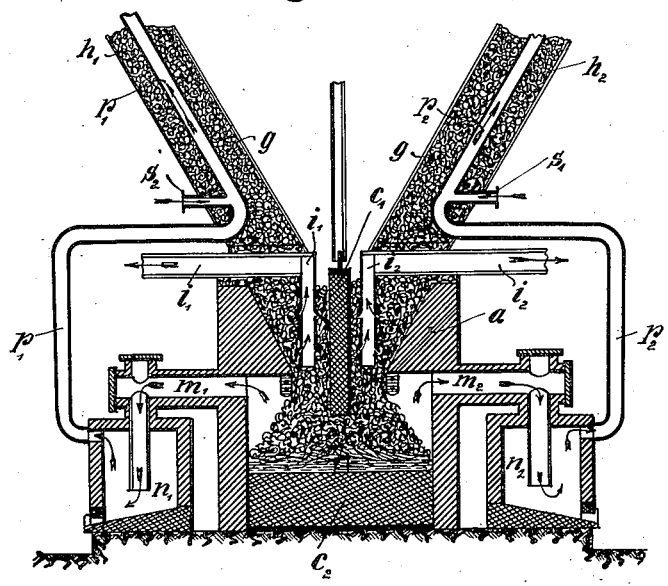

UNITED STATES PATENT OFFICE.

ALOIS HELFENSTEIN, OF VIENNA, AUSTRIA-HUNGARY.

PROCESS OF OBTAINING METALS, SUCH AS LEAD OR ZINC, IN AN ELECTRIC FURNACE.

1,167,998.　　　　　Specification of Letters Patent.　　Patented Jan. 11, 1916.

Application filed February 2, 1914. Serial No. 816,036.

*To all whom it may concern:*

Be it known that I, ALOIS HELFENSTEIN, a citizen of Switzerland, residing at 50 Bastiengasse, Vienna, Austria-Hungary, have invented a new and useful Improvement in Processes of Obtaining Metals, Such as Lead or Zinc, in an Electric Furnace, of which the following is a specification.

My invention relates to improvements in processes for obtaining metals, such as lead or zinc, etc., in liquid form in electric distillation furnaces; and the objects of my improvements are to facilitate and cheapen the obtaining of metal in liquid form, and to reduce the proportion of dust formed.

The obtaining of metals such as lead and zinc, in vaporous form from the ore, and then condensing the vapors into a liquid, is attended by the inconvenience that substances (as for instance water and carbonic acid) are contained in the mixture, which in the heating process are carried off in gaseous or vaporous form, and partly cause a reoxidation of the metal, as are also other materials (for instance hydrogen and hydrocarbons) which partly combine with the metal vapor. These are the principal causes of the formation of metallic dust, as the impure metal does not condense in liquid form, but only precipitates as dust or powder.

Up to the present time, continuous processes have found but little adoption in technics, as the yield of liquid metal has been but small, and on the other hand the amount of dust obtained very great. Further the condensation is more complete in proportion to the amount of zinc, and less so in proportion to that of carbonic oxid in the gas.

The process here described has for its object to effect a perfect separation of the two products and consists essentially in the fact that the gases and vapors usually generated are exhausted separately from one another, before the reduction process proper takes place. This exhausting of the gases and vapors can be so effected that carbonic oxid which has already been formed is removed at the same time, so that from the very inception of the process the concentrated metallic vapors reach the condensation chamber.

In the drawing are shown two methods of carrying out this invention.

Figure 1 shows in vertical axial section an electric zinc furnace with preheater; Fig. 2 a section through the line C D of Fig. 1 and Fig. 3 a furnace with hanging electrodes, in vertical lengthwise section.

The electric furnace $a$ (Figs. 1 and 2) consists of the masonry furnace chamber $b$, the poles $c^1$, $c^2$ the resistance $d$, and the furnace mantle or outer shell, $e$. The electrical current is conducted from the clamp $f^1$ to the pole $c^2$, and passes through the outer shell $e$ to the clamp $f^2$. The clamps $f_1$, $f_2$ are in electric connection with the poles of a transformer or other source of current. About the heating resistance $d$ lies the ore mixture which is to be reduced. Over the electric furnace $a$ there is a shaft $h$ for pre-heating and charging the ore, and through which the charge is continuously fed down to the smelting hearth. This shaft $h$ has a charging hopper $k$ and an inner gas exhaust pipe $i$; and is surrounded by the annular heating chamber $l$.

The process takes place in such manner that the mixture $g$ which comes from the shaft is brought in the electric furnace to the reduction temperature by means of the electrically heated resistance $d$. This causes the development of metallic vapors and carbonic oxid, which are led off through the central pipe $m$ to the condensation chamber $n$, where the main portion of the metal falls in liquid form, and from time to time may be tapped off at the tap hole $o$. The carbonic oxid gas, which is freed as far as possible from metal, passes through the lateral pipes $p^1$, $p^2$ to the heating chamber $l$, of the pre-heater shaft, into which air is conducted through the nozzles $s^1$, $s^2$, $s^3$, $s^4$ (Fig. 2). Here they are burned and effect a heating of the charge $g$ in the shaft $h$. From the heating chamber $l$ the burner gases are conducted by the pipe $t$. As soon as the electric reduction process is started, the gases and vapors developed by the pre-heating are continuously exhausted away through the gas discharge pipe $i$ in the fore-shaft. To facilitate condensation, this exhaustion can be so effected that part of the metal and of the carbonic oxid are led away from the reduction zone, by which the ascending metal vapor condenses in the charge, and is again conducted with the falling ore to the reduction chamber, while the carbonic oxid gas; together with the other gases developed in the preheating zone, are conducted away through the pipe $i$. The effect of this is that the zinc vapors which pass through the pipe $m$ to the condensation chamber $n$, are free from re-oxidizing gases and vapors, and are richer in metal, but poorer in carbonic oxid.

When the heating resistance $d$ is used up by the process, either it must be replaced or the contents of the furnace acts as a resistance, so that the current passes from the pole $c^1$ through the charge to the pole $c^2$.

Any by-metals (such as lead, silver, etc., in zinc reduction) collecting on the floor or bottom of the furnace, as well as the slag, are removed from time to time through the tap hole $w$.

In the furnace shown in Fig. 3 there is a vertically regulatable electrode $c_1$, about which the charge $g$ enters the smelting hearth; $c^2$ being the under electrode. While the metal vapors formed in the electric smelting chamber are led off with the carbonic oxid through the pipes $m^1$, $m^2$, in the direction of the arrow, to the condensation chambers $n^1$, $n^2$, in which the metal condenses as liquid, the carbonic oxid gas is led off from the latter chambers through the pipes $p^1$, $p^2$ into the charging shafts $h^1$, $h^2$, in which they are mixed with air coming through the nozzles $s^1$, $s^2$, and burned; while they give off the lead thus developed to the charge lying around the pipes.

About the vertical electrode $c$, there are arranged in the charging shaft of the electric furnace gas exhausting pipes $i^1$, $i^2$, through which are led off the vapors evolved from the charge (mixed, if desired, with the carbonic oxid coming from the electric reduction chamber).

It goes without saying, that the strength of the different exhausts may be regulated at will, and the condensation of the zinc or other metal thus made as thorough as possible.

The process above described can be employed for all metals which can be produced in liquid form.

What I claim as my invention and desire to be secured to me by Letters Patent of the United States of America, is as follows:

1. A process for obtaining metal vapors, especially those of zinc and lead, from ores in an electric furnace, which consists of preheating the charge before the distillation process takes place, exhausting the gases and vapors developed in the preheating zone to free the metallic vapors from gases favoring oxids or formation of metallic dust, and exhausting part of the carbon oxids and metal vapors generated in the distillation zone.

2. A process for obtaining metal vapors, especially those of zinc and lead, from ores in an electric furnace, which consists of preheating the charge before the distillation process takes place, exhausting the gases and vapors developed in the preheating zone to free the metallic vapors from gases favoring oxids or formation of metallic dust, exhausting part of the carbon oxids and metal vapors generated in the distillation zone, and conducting the carbon oxids escaping with the metal vapors into the preheating zone to preheat the charge.

In testimony whereof I affix my signature in presence of two witnesses.

ALOIS HELFENSTEIN.

Witnesses:
  IGNEZ KNORPLMACHER,
  AUGUST FUGGER.